United States Patent [19]

Campbell et al.

[11] 4,163,117
[45] Jul. 31, 1979

[54] HEAT-RECOVERABLE ARTICLES AND THEIR USE

[75] Inventors: Bruce D. Campbell, Redwood City; Eugene F. Lopez, Sunnyvale, both of Calif.

[73] Assignee: Raychem Corporation, Menlo Park, Calif.

[21] Appl. No.: 897,805

[22] Filed: Apr. 19, 1978

[51] Int. Cl.$^2$ .................... H02G 15/04; B29C 27/00; B32B 31/00; F16L 25/00

[52] U.S. Cl. .................................. 174/74 A; 138/119; 156/86; 174/84 R; 174/DIG. 8; 264/25; 264/230; 264/249; 285/381; 343/18 A; 428/35; 428/36; 428/212; 428/913

[58] Field of Search ............ 174/74 A, 84 R, DIG. 8; 138/89, 95, 96 R, 119, 140, DIG. 5; 285/381; 403/28, 29, 30, 273; 264/25, 230, 249; 156/84, 85, 86, 344; 428/35, 36, 43, 212, 913

[56] References Cited

U.S. PATENT DOCUMENTS

| | | | |
|---|---|---|---|
| 2,027,962 | 1/1936 | Currie | 174/DIG. 8 |
| 3,243,211 | 3/1966 | Wetmore | 174/DIG. 8 |
| 3,396,455 | 8/1968 | Sherlock | 174/DIG. 8 |
| 3,526,683 | 9/1970 | Heslop et al. | 174/DIG. 8 |
| 3,950,604 | 4/1976 | Penneck | 428/36 |
| 4,035,534 | 7/1977 | Nyberg | 174/DIG. 8 |

Primary Examiner—William R. Dixon, Jr.
Attorney, Agent, or Firm—Lyon & Lyon

[57] ABSTRACT

A method of making a composite structure comprising an elongate substrate, especially an insulated electrical cable, and a covering member which has been heat-recovered and sealed around the substrate. A heat-recoverable article of a cross-linked crystalline polymer composition which transmits 5–50% of infra-red radiation incident thereon is placed around a substrate whose exterior is composed of a polymeric composition which is at most lightly cross-linked, which absorbs infra-red radiation and which has a crystalline melting point below that of the heat-recoverable article. The assembly is exposed to infra-red radiation such that the heat-recoverable article is heated to its recovery temperature and the exterior of the substrate is heated to its crystalline melting point, preferably before it is contacted by said article as it recovers. In this way an excellent seal can be created between the substrate and the recovered article without the need for any auxiliary fusible material such as a hot melt adhesive.

39 Claims, 2 Drawing Figures

HEAT-RECOVERABLE ARTICLES AND THEIR USE

BACKGROUND OF THE INVENTION

1. Field of the Invention

This invention relates the heat-shrinkable polymeric articles and their use.

2. Summary of the Prior Art

Heat-recoverable polymeric articles are well known in the art and heat-shrinkable articles have been extensively used for covering substrates, for example the ends of electrical cables and splices between electrical cables. Reference may be made, for example, to U.S. Pat. Nos. 2,027,692, 3,086,242, 3,243,211 and 3,396,455 the disclosures of which are incorporated by reference herein. When a hermetic seal is needed between the heat-recovered article and the substrate and/or the seal must withstand high separation forces, as for example when the substrate is a pressurised telephone cable, it is common practice to coat the interior surface of the heat-recoverable article with a layer of a fusible material such as a hot-melt adhesive or a mastic to improve the seal between the recovered article and the substrate. Heat-shrinkable articles having a solder insert have been extensively used to provide insulated soldered joints between electrical components. Recovery of heat-recoverable articles is usually effected by hot air or a flame. However, the combination of convection and conduction heating which these methods involve can be unsatisfactory when a fusible insert is employed, since the continued heating which is required to fuse the insert, after the article has recovered, can damage the article. This problem is considered in U.S. Pat. No. 3,396,455, which describes the use of infra-red radiation to heat a heat-shrinkable polymeric sleeve and a fusible insert, typically a solder insert, positioned within the sleeve, the sleeve transmitting a fraction of the infra-red radiation to the insert so that the insert is heated to its fusing temperature more rapidly than it would be if it was heated by convection and conduction; preferably the sleeve is heated to its recovery temperature before the insert reaches its fusing temperature.

One method of making a heat-recoverable article having a closed cross-section is by wrapping a sheet of heat-recoverable material around a substrate to be covered and securing the edges of the sheet together. A number of ways of securing the edges together have been disclosed, for example in U.S. Pat. Nos. 3,379,218 and 3,455,336, the disclosures of which are incorporated herein by reference.

SUMMARY OF THE INVENTION

We have now discovered, in accordance with the present invention, that an excellent seal can be created between a substrate and a heat-recovered article, without the need for auxiliary fusible material between them, by a method which comprises (1) providing an assembly comprising an elongate substrate and a covering member, said covering member comprising a heat-shrinkable band portion which has a closed cross-section and passes around a section of said substrate; said section comprising an exterior wall portion composed of a first crystalline polymeric composition which has a gel fraction of at most 0.3 and a crystalline melting point $T_1$ and in which there is dispersed an absorptive material which absorbs electromagnetic radiation; and said band portion comprising an interior wall portion composed of a second crystalline polymeric compostion which has a gel fraction of at least 0.3 and a crystalline melting point $T_2$ equal to at least $(T_1+5)°$ C. and in which there is dispersed an absorptive material which absorbs electromagnetic radiation; and (2) exposing the exterior of said heat-shrinkable band to electromagnetic radiation, said radiation and said adsorptive materials and the amounts thereof being such that said band portion absorbs a fraction of said radiation which heats said band portion to its shrinkage temperature and transmits a fraction of said radiation which is absorbed by said exterior wall portion of the substrate and heats the exterior thereof to a temperature which is at least equal to its crystalline melting point $T_1$, whereby said interior wall portion of the covering member shrinks into direct sealing contact with said exterior wall portion of the substrate.

The invention also includes a generally tubular heat-shrinkable article which comprises at least one heat-shrinkable band portion whose interior surface is composed of a cross-linked polymeric composition, which composition comprises (a) a cross-linked crystalline olefin polymer having a gel fraction of at least 0.3, a density of at least 0.95 and a modulus at 175° C. of at least 40 psi, and (b) an infra-red absorptive filler dispersed in said polymer in amount such that said band portion, when exposed to radiation having a wavelength of 1.15 microns, transmits 5 to 50% of the radiation.

BRIEF DESCRIPTION OF THE DRAWINGS

The invention is illustrated in the accompanying drawings, in which.

DETAILED DESCRIPTION OF THE INVENTION

Figures 1, 2:
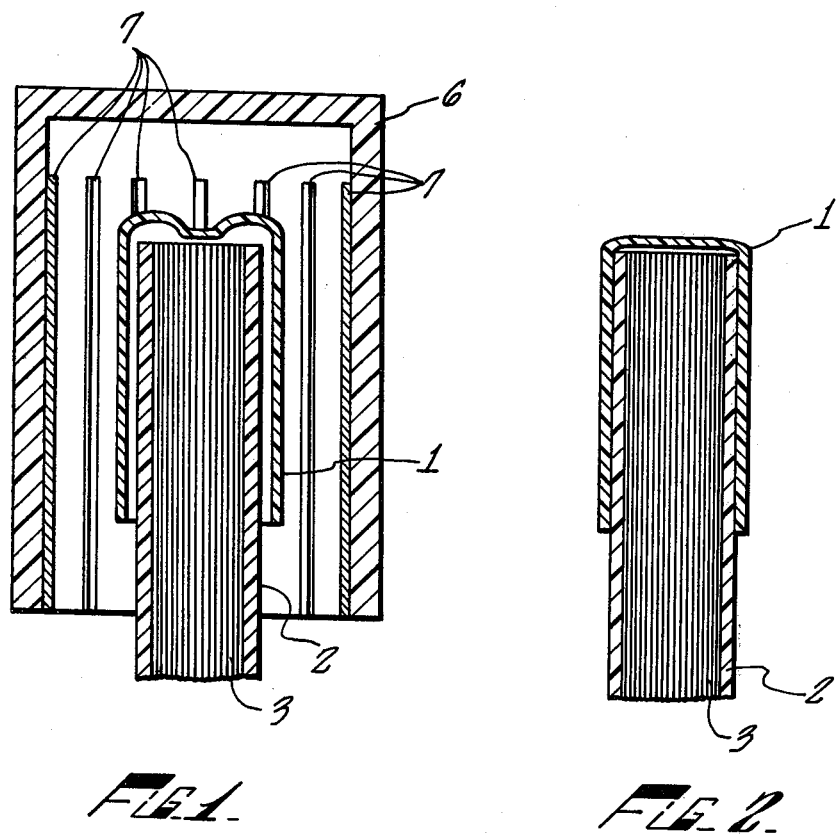
FIG. 1 is a cross-sectional view of an assembly of an air-filled telephone cable, a heat-shrinkable end cap placed around the cable, and an infra-red heater placed around the end cap, ready for carrying out the method of the invention.
FIG. 2 is a cross-sectional view of the cable having a heat-recovered end cap sealed thereto obtained from the assembly of FIG. 1.

The radiation used to heat the substrate and recoverable article is preferably infra-red radiation, in which case the absorptive materials in the substrate and the article (which materials can be the same or different) should, of course, be ones which absorb infra-red radiation, e.g., carbon black, which is usually preferred. The amount of absorptive material in the second crystalline polymeric composition is preferably such that the heat-shrinkable band portion transmits 5 to 50%, particularly 5 to 40%, especially 5 to 20% of the radiation used to effect heating, for example, in the case of infra-red radiation, radiation of wavelength 1.15 microns. When using carbon black as the absorptive material, the amount thereof in the second polymeric composition is generally 0.01 to 0.04% by weight, preferably 0.025 to 0.035% by weight. The amount of absorptive material in the exterior wall portion of the substrate is preferably such that it will absorb substantially all the radiation transmitted by the heat-shrinkable article, for example 0.25 to 2%, preferably 0.25 to 1%, in the case of carbon black. However, some reflection and transmission of the radiation can take place providing the desired heating effect is obtained.

Preferably the exterior of exterior wall portion of the substrate is heated to a temperature of at least $T_1$ before the heat-shrinkable band portion is heated to its shrinkage temperature. In order to obtain the best sealing, the exterior wall portion should be heated to a temperature of at least $T_1$ to a depth of at least 0.0005 inch, e.g., 0.0005 to 0.005 inch. However, if the wall portion is heated excessively, this can lead to relatively less satisfactory results, and it is therefore preferred that at a depth of 0.075 inch, especially at a depth of 0.050 inch, the temperature of the wall portion should not exceed $(T_1-5)°$ C.

The method of the present invention is of particular value for applying an end cap to an air-core telephone cable. However, it is to be understood that the invention is useful in a wide variety of other situations which make use of the combination of parameters which we have found to be critical to providing a high quality seal by direct contact between a heat-shrinkable article and a substrate. While the invention does not rely upon the use of a fusible material such as a hot-melt adhesive or a mastic to provide the seal, it is to be understood that the invention does not exclude the possibility of using a fusible insert at some other point in the assembly, for example a solder insert to provide or improve an electrical connection between cables within a tubular heat-recovered splice case, or an intermediate layer of a hot melt adhesive or mastic in an area adjacent to the area of direct contact between the substrate and the article.

The first crystalline polymeric composition is at most lightly cross-linked, and is preferably substantially free from cross-linking. Its gel fraction is below 0.3, preferably below 0.2, especially below 0.1. The polymer generally has a crystallinity of at least 15%, preferably at least 20%. Suitable polymers include olefin polymers (including copolymer of olefins with other comonomers, generally in amount less than 50% by weight), especially ethylene polymers containing at least 90% by weight of ethylene, e.g., polyethylene and copolymers of ethylene with one or more comonomers such as vinyl acetate and alkyl esters of acrylic and methacrylic esters.

The polymer in the second crystalline polymeric composition is cross-linked to a gel fraction of at least 0.3, preferably at least 0.4 and has a crystalline melting point which is at least $(T_1+5)$, preferably at least $(T_1+10)$ especially at least $(T_1+15)°$ C. Polymers having a modulus at 175° C. of at least 40 psi, e.g. 40 to 75 psi, are preferred. It is theorised that when using such polymers, the band portion, as it shrinks, exerts a hoop stress on the substrate which helps to ensure a good seal. The modulus at 175° C. is measured at 100% extension using a specimen 0.125 inch wide and 0.075 inch thick on an Instron tensile tester with the jaws 1 inch apart and a separation speed of 2 inch/minute.

The heat-shrinkable band portion of the covering member will generally be of uniform composition, in which case the interior wall portion referred to above will constitute the whole of the band portion, but the invention includes covering members in which the band portion includes one or more layers on the outside of the interior wall portion, which layers may (but need not be) independently heat-recoverable.

Referring now to the drawings, FIG. 1 shows heat-shrinkable end cap 1 disposed about an air-core telephone cable containing telephone wires 3 and insulating jacket 2 composed of an ethylene/vinyl acetate copolymer containing about 4% by weight of vinyl acetate and having about 3.0% of carbon black dispersed therein. End cap 1 is composed of cross-linked high density polyethylene containing about 0.03% by weight of carbon black.

End cap 1 is formed with a heat-recoverable protuberance in the end thereof, as described and claimed in application Ser. No. 875,110 by James E. Jervis. Also shown in FIG. 1 is cap-heater 6 containing twelve 6 inch long quartz tungsten lamps 7. The cap heater is switched on for 30 seconds and effects recovery of the end cap around the cable to give the structure shown in FIG. 2.

The invention is further illustrated in the following Example.

EXAMPLE

High density polyethylene of density 0.96 ("Alathon 7030"), 0.03% of carbon black and 1% of zinc stearate (a mould release agent) were blended together. The blend was injection moulded at 6000 psi into a cylindrical cap having an internal diameter of 0.70 inch, a length of 3 inch and a thickness of 0.09 inch. The cap was irradiated to a dosage of about 10 Mrads, and then heated to about 163° C. in a mixture of glycerine and water. The heated cap was expanded by means of air at 90 psi into water cooled mould so that it had an internal diameter of about 1.75 inch. The cap was placed over the end of an air-core telephone cable of outer diameter about 1.4 inch in an assembly as shown in FIG. 1, and recovered by switching on the cap heater for 30 seconds. The seal between the cable and the cap withstood at least 120 lb of shear load per square inch of sealed area.

We claim:

1. A method of covering a substrate with a covering member which is sealed around at least one section of said substrate, which method comprises
   (1) providing an assembly comprising an elongate substrate and a covering member, said covering member comprising a heat-shrinkable band portion which has a closed cross-section and passes around a section of said substrate; said section of the substrate comprising an exterior wall portion composed of a first crystalline polymeric composition which has a gel fraction of at most 0.3 and a crystalline melting point $T_1$ and in which there is dispersed an absorptive material which absorbs electromagnetic radiation; and said band portion comprising a heat-shrinkable interior wall portion composed of a second crystalline polymeric composition which has a gel fraction of at least 0.3 and a crystalline melting point $T_2$ equal to at least $(T_1+5)°$ C. and in which there is dispersed an absorptive material which absorbs electromagnetic radiation; and (2) exposing the exterior of said heat-shrinkable band portion to electromagnetic radiation, said radiation and said absorptive materials and the amounts thereof being such that said band portion absorbs a fraction of said radiation which heats said band portion to its shrinkage temperature and transmits a fraction of said radiation, at least a portion of the transmitted fraction being absorbed by said exterior wall portion of the substrate and heating said exterior wall portion of the substrate to a temperature which is at least equal to its crystalline melting point $T_1$, whereby said interior wall portion of the covering member shrinks into direct sealing contact with said exterior wall portion of the substrate.

2. A method according to claim 1 wherein said radiation is infra-red radiation and said heat-shrinkable band portion of the covering member, when exposed to radiation having a wavelength of 1.15 microns, transmits 5 to 40% of the radiation.

3. A method according to claim 2 wherein the absorptive filler in said first and second polymeric compositions is carbon black.

4. A method according to claim 1 wherein said first polymeric composition comprises an ethylene polymer having a density of 0.90 to 0.94.

5. A method according to claim 4 wherein said density is 0.91 to 0.93.

6. A method according to claim 4 wherein said ethylene polymer comprises at least 90% by weight of ethylene units.

7. A method according to claim 4 wherein said second polymeric composition comprises an ethylene polymer having a density of 0.95 to 0.97.

8. A method according to claim 7 wherein said ethylene polymer of said second polymeric composition is polyethylene and has a modulus at 175° C. of 40 to 75 psi.

9. A method according to claim 1 wherein said first polymeric composition has a gel fraction of at most 0.2 and said second polymeric composition has a gel fraction of at least 0.4.

10. A method according to claim 9 wherein said first polymeric composition is substantially free from cross-linking.

11. A method according to claim 1 wherein $T_2$ is equal to at least $(T_1+10)°$ C.

12. A method according to claim 1 wherein the exterior of said exterior wall portion of the substrate is heated to a temperature of at least $T_1$ before said band portion is heated to its shrinkage temperature.

13. A method according to claim 12 wherein the said exterior wall portion is heated to a temperature of at least $T_1$ to a depth of at least 0.0005 inch.

14. A method according to claim 12 wherein said exterior wall portion is heated to a temperature of not more than $(T_1-5)°$ C. at a depth of 0.075 inch.

15. A method according to claim 12 wherein said exterior wall portion is heated to a temperature of at least $T_1$ to a depth of 0.0005 to 0.005 inch.

16. A method according the claim 1 wherein the exterior of said heat-shrinkable band is exposed to infra-red radiation.

17. A method of covering an electrical cable having an insulating jacket with a covering member sealed around at least one section of said insulating jacket, which method comprises (1) providing an assembly comprising said electrical cable and a generally tubular covering member, said covering member comprising a heat-shrinkable band portion which has a closed cross-section and passes around a section of said insulating jacket, said insulating jacket being composed of a first polymeric composition comprising a crystalline olefin polymer having a crystalline melting point $T_1$ and a gel fraction of at most 0.3 and, dispersed in said polymer, an infra-red-absorptive filler; and said band portion being composed of a second polymeric composition comprising a cross-linked crystalline olefin polymer having a crystalline melting point $T_2$ which is at least $(T_1+5)°$ C. and a gel fraction of at least 0.3 and, dispersed in said cross-linked polymer, an infra-red-absorptive filler in amount such that said band portion, when exposed to radiation having a wavelength of 1.15 microns, transmits 5 to 50% of the radiation; and (2) exposing the exterior of said heat-shrinkable band portion to infra-red radiation, said radiation and said infra-red absorptive materials and the amounts thereof being such that said band portion absorbs a fraction of said radiation which heats said band portion to its shrinkage temperature and transmits a fraction of said radiation, at least a portion of the transmitted fraction being absorbed by said section of the insulating jacket and heating the exterior thereof to a temperature which is at least equal to its crystalline melting point $T_1$, whereby said band portion shrinks into direct sealing contact with said section.

18. A method according to claim 17 wherein the absorptive filler in said first and second polymeric compositions is carbon black.

19. A method according to claim 18 wherein said first polymeric composition comprises an ethylene polymer which contains at least 90% by weight of ethylene units, has a density of 0.91 to 0.93 and a crystallinity of at least 20%, and is substantially free from cross-linking, and said second polymeric composition comprises a polyethylene which has a density of 0.95 to 0.97 and a modulus at 175° C. of 40 to 75 psi.

20. A method according to claim 17 wherein the exterior of said section of the insulating jacket is heated to a temperature of at least $T_1$ before said band portion is heated to its shrinkage temperature.

21. A method according to claim 20 wherein said section of the insulating jacket is heated to a temperature of at least $T_1$ to a depth of at least 0.0005 inch.

22. A generally tubular heat-shrinkable article which comprises at least one heat-shrinkable band portion which has a closed cross-section and which comprises a heat-shrinkable interior wall portion composed of a cross-linked polymeric composition, which composition comprises (a) a cross-linked crystalline olefin polymer having a gel fraction of at least 0.3, a density of at least 0.95 and a modulus at 175° C. of at least 40 psi, and (b) an infra-red-absorptive filler dispersed in said polymer in amount such that said band portion, when exposed to radiation having a wavelength of 1.15 microns, transmits 5 to 50% of the radiation.

23. An article according to claim 22 wherein said band portion, when exposed to radiation having a wavelength of 1.15 microns, transmits 5 to 40% of the radiation.

24. An article according to claim 23 wherein said band portion, when exposed to radiation having a wavelength of 1.15 microns, transmits 5 to 20% of the radiation.

25. An article according to claim 22 wherein said olefin polymer is polyethylene and has a modulus at 175° C. of 40 to 75 psi.

26. An article according to claim 24 wherein said olefin polymer is polyethylene having a gel fraction of at least 0.4.

27. An article comprising an elongate substrate and a covering member therefor, the covering member comprising a heat-shrinkable band portion which has a closed cross-section and passes around a section of the substrate comprising an exterior wall portion composed of a first crystalline polymeric composition which has a gel fraction of at most 0.3 and a crystalline melting point $T_1$ and in which there is dispersed an absorptive material which absorbs electromagnetic radiation; and the band portion comprising a heat-shrinkable interior wall portion composed of a second crystalline polymeric composition which has a gel fraction of a least 0.3 and a crystalline melting point $T_2$ equal to at least $(T_1+5)°$ C. and in which there is dispersed an absorptive material which absorbs electromagnetic radiation; and wherein the first and second crystalline polymeric compositions each contain sufficient absorptive materials such that when said band portion is exposed to electromagnetic radiation of a selected wavelength, said band portion absorbs a fraction of said radiation which heats said band portion to its shrinkage temperature and transmits a fraction of said radiation which is absorbed by said exterior wall portion of the substrate and heats the exterior thereof to a temperature which is at least equal to its crystalline melting point $T_1$ whereby said interior wall portion of the covering member shrinks into direct sealing contact with said exterior wall portion of the substrate.

28. An article according to claim 27 wherein when said band portion is exposed to radiation having a wavelength of 1.15 microns, the band portion transmits 5 to 40% of the radiation.

29. An article according to claim 28 wherein the absorptive filler in said first and second polymeric compositions is carbon black.

30. An article according to claim 27 wherein said first polymeric composition comprises an ethylene polymer having a density of 0.90 to 0.94.

31. An article according to claim 30 wherein said density is 0.91 to 0.93.

32. An article according to claim 30 wherein said ethylene polymer comprises at least 90% by weight of ethylene units.

33. An article according to claim 30 wherein said second polymeric composition comprises an ethylene polymer having a density of 0.95 to 0.97.

34. An article according to claim 33 wherein said ethylene polymer of said second polymeric composition is polyethylene and has a modulus at 175° C. of 40 to 75 psi.

35. An article comprising an electrical cable having an insulating jacket and a generally tubular covering member therefor, the covering member comprising a heat-shrinkable band portion which has a closed cross-section and which passes around a section of the insulating jacket, the insulating jacket being composed of a first polymeric composition comprising a crystalline olefin polymer having a crystalline melting point $T_1$ and a gel fraction of at most 0.3 and, dispersed in the polymer, an infra-red-absorptive filler; and the band portion being composed of a second polymeric composition comprising a cross-linked crystalline olefin polymer having a crystalline melting point $T_2$ which is at least $(T_1+5)$ °C. and a gel fraction of at least 0.3 and, dispersed in the cross-linked polymer, an infra-red-absorptive filler in amount such that the band portion, when exposed to radiation having a wavelength of 1.15 microns, transmits 5 to 50% of the radiation, the amounts of infra-red-absorptive materials in the first and second polymeric composition being such that when the exterior of the heat-shrinkable band portion is exposed to infra-red radiation of a selected wavelength the band portion absorbs a fraction of the radiation which heats said band portion to its shrinkage temperature and transmits a fraction of the radiation which is absorbed by the section of the insulating jacket and heats the exterior thereof to a temperature which is at least equal to its crystalline melting point $T_1$, whereby the band portion shrinks into direct sealing contact with the section.

36. An article according to claim 35 wherein the absorptive filler in said first and second polymeric compositions is carbon black.

37. An article according to claim 35 wherein said first polymeric composition comprises an ethylene polymer which contains at least 90% by weight of ethylene units, has a density of 0.91 to 0.93 and a crystallinity of at least 20%, and is substantially free from cross-linking, and said second polymeric composition comprises a polyethylene which has a density of 0.95 to 0.97 and a modulus at 175° C. of 40 to 75 psi.

38. An article according to claim 35 wherein the exterior of said section of the insulating jacket is heated to a temperature of at least $T_1$ before said band portion is heated to its shrinkage temperature.

39. An article according to claim 38 wherein said section of the insulating jacket is heated to a temperature of at least $T_1$ to a depth of at least 0.0005 inch.

* * * * *